US006250344B1

United States Patent
Gerritse

(10) Patent No.: US 6,250,344 B1
(45) Date of Patent: Jun. 26, 2001

(54) APPARATUS FOR DOSED DISPENSING OF A NUMBER OF DIFFERENT LIQUID OR PASTY MASSES

(75) Inventor: Jan Gerritse, Brummen (NL)

(73) Assignee: Gerritse Beheer B.V. (NL)

( * ) Notice: Subject to any disclaimer, the term of this patent is extended or adjusted under 35 U.S.C. 154(b) by 0 days.

(21) Appl. No.: 09/463,734

(22) PCT Filed: Jul. 24, 1998

(86) PCT No.: PCT/NL98/00427

§ 371 Date: May 23, 2000

§ 102(e) Date: May 23, 2000

(87) PCT Pub. No.: WO99/06278

PCT Pub. Date: Feb. 11, 1999

(30) Foreign Application Priority Data

Jul. 30, 1997 (NL) .................................................. 1006685

(51) Int. Cl.⁷ ...................................................... B65B 1/30
(52) U.S. Cl. ............................ 141/83; 141/103; 141/104
(58) Field of Search .............................. 141/83, 100, 103, 141/104; 222/144.5

(56) References Cited

U.S. PATENT DOCUMENTS

| 2,158,023 | * | 5/1939 | Smith . | |
|---|---|---|---|---|
| 2,455,433 | | 12/1948 | Matsen et al. | 249/55 |
| 3,112,806 | * | 12/1963 | Stambera . | |
| 3,556,234 | * | 1/1971 | Moreno | 141/83 |
| 4,009,068 | | 2/1977 | Boussageon | 156/380 |
| 4,554,955 | * | 11/1985 | von Lersner et al. | 141/104 |
| 4,972,882 | * | 11/1990 | Kohashi | 141/83 |
| 4,997,330 | * | 3/1991 | Blezard | 414/225 |
| 5,111,855 | * | 5/1992 | Boeck et al. | 141/83 |

FOREIGN PATENT DOCUMENTS

| 0052546 | | 5/1982 | (EP) . | |
|---|---|---|---|---|
| 0598932 A1 | * | 6/1994 | (EP) | 141/104 |
| 2430902 | | 2/1980 | (FR) . | |
| 1252089 | | 5/1972 | (GB) . | |

* cited by examiner

Primary Examiner—Steven O. Douglas
Assistant Examiner—Khoa Huynh
(74) Attorney, Agent, or Firm—Webb Ziesenheim Logsdon Orkin & Hanson, P.C.

(57) ABSTRACT

An apparatus for dosed dispensing of a plurality of different liquid or pasty masses to a receiving container. The apparatus includes: a first supporting device for supporting containers for the masses in fixed positions; a fixedly disposed annular frame bearing a plurality of dispensing nozzles controllable by a control device and each individually connectable to the containers via respective conduits; a second supporting device controllable by the control device for supporting the receiving container such that the receiving container is displaceable in an annular path corresponding with the annular form of the annular frame and placeable temporarily beneath a chosen dispensing nozzle for receiving mass dispensed by the chosen dispensing nozzle; a weighing device supported by the second supporting device and configured to support the receiving container, with the weighing device further configured to supply weight signals to the control device; wherein the weighing device is connected via the second supporting device to the control device by cables such that when the second supporting device progresses through a path extending through 360° net torsion of the respective cables is substantially zero.

9 Claims, 5 Drawing Sheets

APPARATUS FOR DOSED DISPENSING OF A NUMBER OF DIFFERENT LIQUID OR PASTY MASSES

BACKGROUND OF THE INVENTION

1. Field of the Invention

The invention relates to an apparatus for dosed dispensing of a number of different liquid or pasty masses.

2. Description of the Prior Art

Such an apparatus is known in diverse embodiments and is also designated as colour kitchen. Said masses are in that case paint, ink, thickening or thinning agents and the like. The masses have to be supplied in predetermined quantities, at least mutual ratios, to a receiving container. This receiving container, for instance a bucket, a can or the like, must be filled with a determined quantity of mixture. For this purpose predetermined quantities of selected masses are admitted successively into the receiving container. As soon as the receiving container is filled with all desired components in the desired quantities, a subsequent receiving container is filled in comparable manner with the constituent components. In this subsequent and other cycles the composition can differ in accordance with the composition of the finally required mixture.

After the constituent components have been placed in the receiving container, homogenization generally takes place by means of known homogenizing processes, in particular stirring and shaking.

An apparatus of said type comprises provisions for supporting containers for the masses for dosed dispensing. These containers can be connected by means of flexible hoses or fixed conduits to dispensing nozzles for individual dosing in each case of a determined quantity of a relevant mass. A placed receiving container and all relevant dispensing nozzles must be mutually movable such that each dispensing nozzle can dispense mass to the receiving container. It is known for instances to fixedly dispose a container on scales and to place the relevant dispensing nozzle in each case above the receiving container by means of a movable frame.

Alternatively, a frame supporting the dispensing nozzles can be fixedly disposed, wherein the scales supporting the receiving container are movable thereunder.

The scales are of importance for dispensing a determined mass in the correct quantity. The control of the dispensing nozzles therefore takes place on the basis of this mass measurement. It is possible in principle to suffice with a mass or weight difference measurement.

In the case where the dispensing nozzles are movable relative to the storage container, use must be made of flexible conduits. The great drawback of flexible conduits is that they are subject to undesirable mechanical loads, in particular torsion, which can greatly reduce the lifespan and can cause malfunctions. Hoses are further subject to ageing. This is the reason why an embodiment is usually recommended with a fixed spatial relation between the dispensing nozzles and the storage containers, in which case fixed conduits of for instance plastic or metal can be used. In that case the scales with a receiving container thereon midst be arranged displaceably relative to the nozzles. Such an arrangement does however have the drawback that the conduits connecting the electronically operating weighing device to central, fixedly disposed control means are likewise subjected to mechanical influences.

This mechanical influence can remain limited by making use of a horizontal linear X or XY mobility within limited boundaries. Such an arrangement has the drawback however that it takes a relatively large amount of time to go from one side of an array to the other, which may nevertheless occur during operation of the apparatus. Recommended in this respect is an annular arrangement of the dispensing nozzles and a corresponding annular path in which the weighing device with a receiving container thereon can move.

If desired, there may even be a movement predominantly in one direction along such a path. This is not possible however without specific measures, since the conduits providing the necessary supply of electrical energy to the weighing device and the information cables are otherwise placed under torsional stress.

EP 0 052 546 shows an apparatus for dosed dispensing of a number of different liquid or pasty masses according to the preamble of claim 1, wherein there are several dispensing units rotatably disposed, each containing a nozzle, a weighing device and a control means. The main drawback of this apparatus is that it is cost ineffective because it has several weighing devices and control means.

It is an object of the invention to provide an apparatus which obviates all drawbacks of said techniques and is not afflicted with the limitations of the know art.

SUMMARY OF THE INVENTION

In order to achieve this object an apparatus according to the present invention includes a fixedly disposed annular frame bearing the dispensing nozzles and the control means are fixedly disposed, and the weighing device is connected via second supporting means to the fixedly disposed central control means by means of cable means such that when the second supporting means progress through a path extending through 360° the net torsion of these cable means is zero.

A specific embodiments has the special feature that the cable means comprise a fixed part and a part movable together with the second supporting means, which two parts are mutually connected by contact means.

In a variant, this embodiment has the special feature that the fixed part comprises slide rings and the movable part comprises slide contacts co-acting with these slide rings.

Another embodiment has the special feature that the two parts are coupled capacitively to each other.

Yet another embodiment has the special feature that the two parts are coupled inductively to each other.

Yet another embodiment has the special feature that the two parts are coupled optically to each other.

It is noted that both the direct electrical co-action with slide rings and slide contacts and a capacitive, inductive or optical coupling provide the option of transferring energy to the movable weighing device which requires electrical energy to operate correctly, while the reverse route is the transfer of weighing signals to the central control device.

A particular embodiment has the special feature that guide means are arranged for guiding the second supporting means such that when these second supporting means progress, through a path extending through 360° the net rotation thereof is zero. It should be understood that the torsion does not have to be zero at every point on the path. The net torsion over a complete revolution does however have to amount to zero.

This latter described embodiment can be designed such that the guide means comprise an arm which connects the second supporting means slidably, and thus with the required variable distance, to a point outside said annular path such that the orientation of the second supporting means relative to that point is substantially invariable.

Yet another embodiment has the special feature that the guide means are embodied such that the second supporting means have a substantially invariable orientation.

Strictly mathematically, this variant could be understood to mean that the orientation point according to the above described embodiment lies in infinity.

The latter variant can be embodied such that the guide means comprise an arm which connects the second supporting means slidably, and thus with the required variable distance, to a carriage with fixed orientation, which carriage is movable in linear manner in a direction which differs from the longitudinal direction of the arm. This embodiment is preferably implemented such that said direction and the longitudinal direction of the arm are mutually perpendicular.

The above-described mechanical embodiments require a structure wherein elements are movable, and in particular slidable, relative to each other. This is mechanically not always the most desirable structure.

In this respect the invention also provides a variant in which the supporting means are supported by a first toothed wheel which is connected via a transmission element to an equally large second toothed wheel which is disposed fixedly in the centre of the path.

This variant can for instance have the special feature that the transmission element is a toothed belt or chain.

Alternatively, it can be embodied such that the transmission element is a third toothed wheel, wherein the three toothed wheels are disposed such that their centres are always situated on a radial straight line. In all cases the second supporting means have a substantially invariable orientation.

The invention will now be the elucidated with reference to the annexed drawings.

DETAILED DESCRIPTION OF THE PREFERRED EMBODIMENTS

Figure 1:
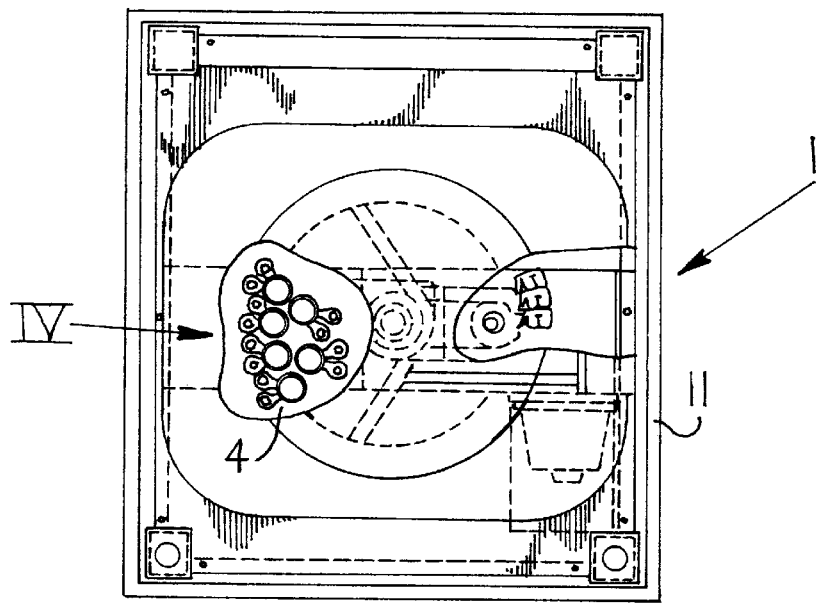
FIG. 1 shows a partly broken away top view of an apparatus according to the invention such that a part of the interior is visible.
Figure 2:
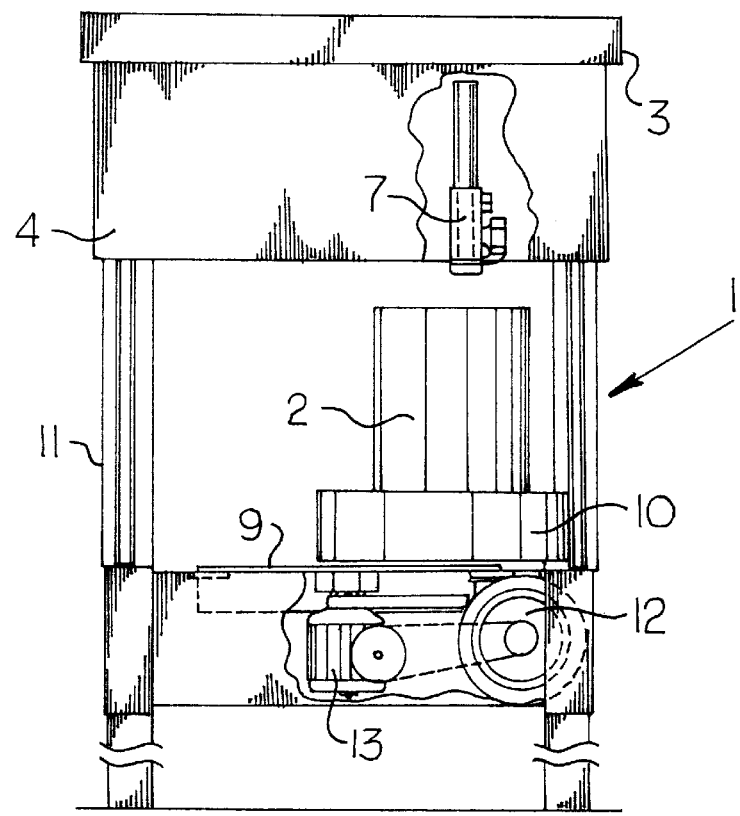
FIG. 2 shows a partly broken away front view of the apparatus.
Figure 3:
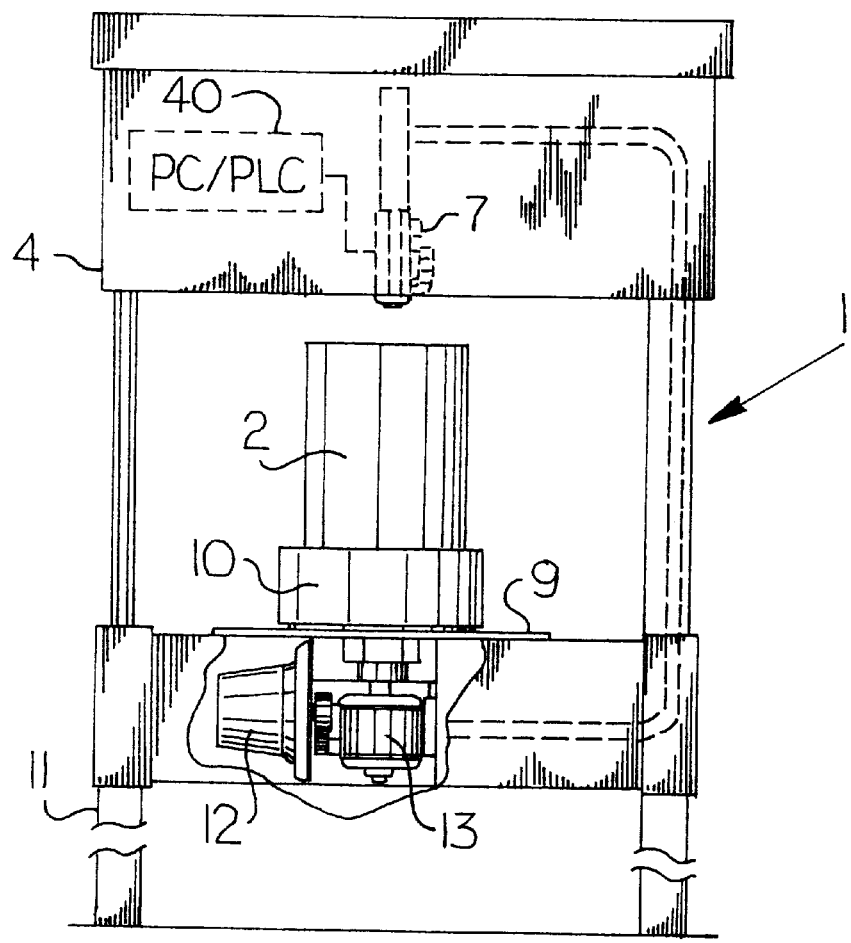
FIG. 3 shows a partly broken away side view of the apparatus.

FIGS. 1, 2 and 3 show an apparatus 1 for dosed dispensing of liquid or pasty masses to a receiving container 2; on top of the apparatus 1 containers for the masses can be placed in fixed positions on a support platform 3.

Figure 4:
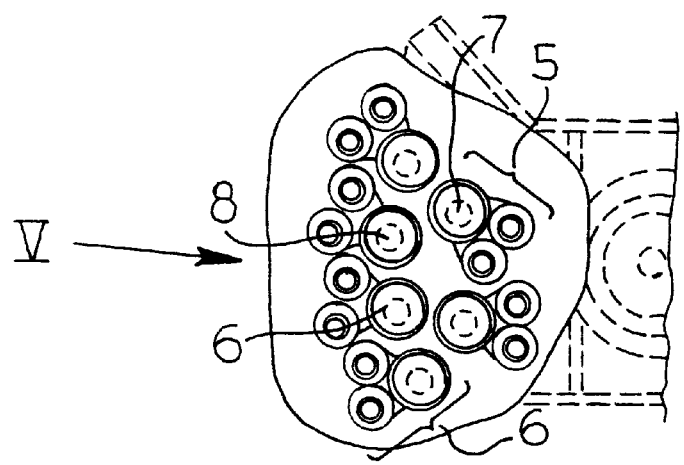
FIG. 4 shows the detail IV in FIG. 1 on enlarged scale.
Figure 5:
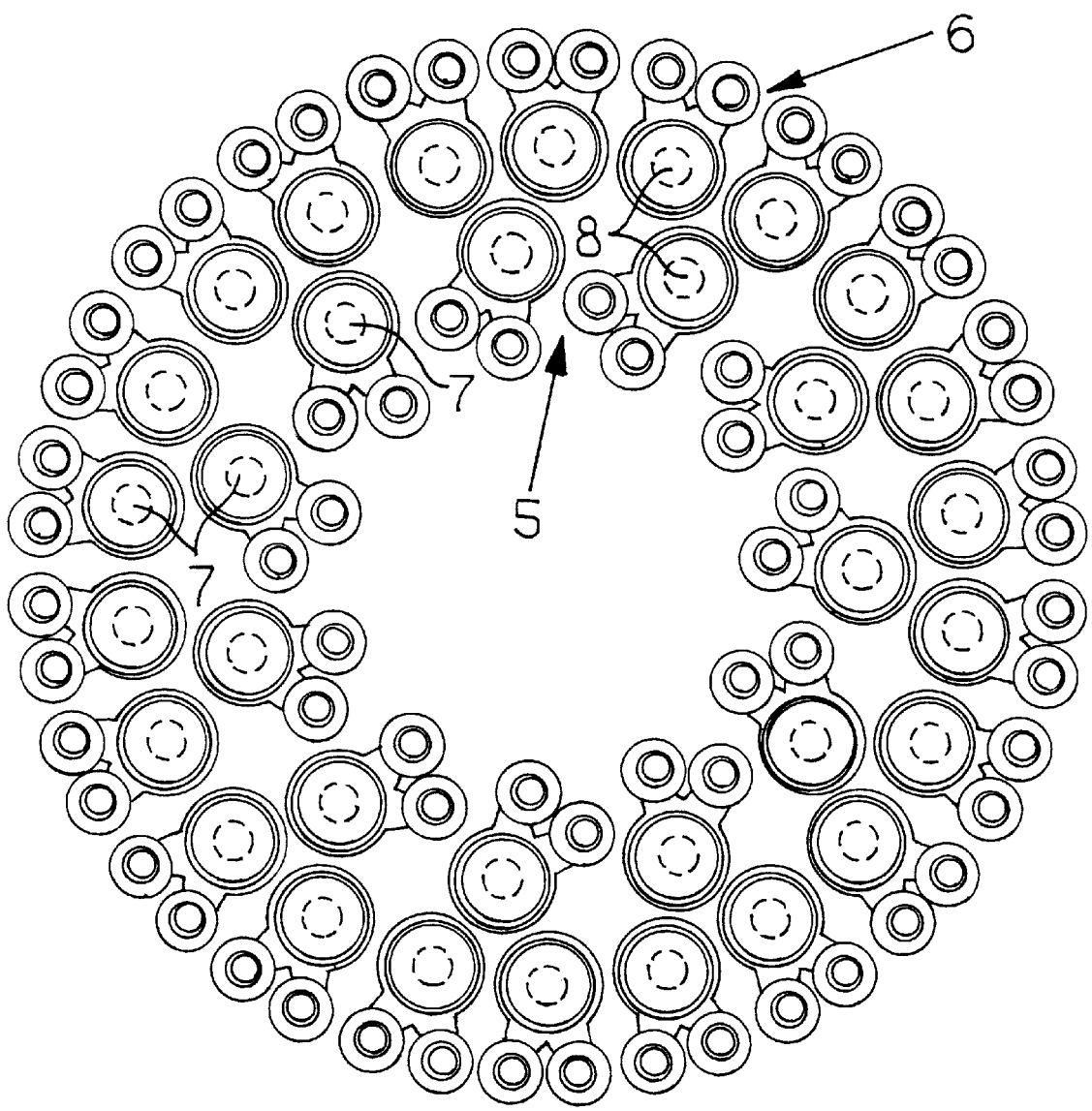
FIG. 5 shows the top view according to FIG. 4 of the total arrangement of all dispensing nozzles.

The apparatus further comprises a fixedly disposed frame 4 which bears a number of dispensing nozzles controllable by fixedly disposed central control means (not shown) such as a PC or PLC. These nozzles are ordered in a respective inner ring 5 and outer ring 6. Inner ring 5 comprises eleven dispensing nozzles, all designated with 7, while outer ring 6 comprises twenty-two dispensing nozzles 8. It is noted that each dispensing nozzle is connected to two conduits, i.e. a supply conduit and a return conduit. It is generally known and usual that mass flows permanently through dispensing nozzles of this type so as not to incur any problems with fouling, caking and lump-forming in the case of prolonged standstill. The dispensing openings are shown particularly clearly in FIGS. 4 and 5 as the central zones of the relatively large annular structures.

The apparatus 1 further comprises second supporting means in the form of a rotatable support platform 9 which bears a weighing device 10. With this configuration receiving container 2 can proceed through a path such that it can receive mass from any of the dispensing nozzles 7, 8 of both the inner ring 5 and the outer ring 6.

The weighing device is connected to a power source and the control means for receiving power supply and for generating information to the control means. This connection is embodied such that the cable means required for this purpose are not subjected to any torsion in this embodiment, irrespective of the angular position of support platform 9. This important aspect of the invention will be further elucidated with reference to FIG. 6.

Support platform 9 is rotatable by means of a motor 12 with transmission means 13 connected thereto. Within the scope of the invention it is not important to discuss the manner in which the control of the motor and optional transmission means takes place such that receiving container 2 is always carried to the correct location and is held still there. Tacho means can for instance co-act with support platform 9.

Not considered at all is the manner in which dispensing nozzles 7, 8 are controlled. It is generally known that use can be made for this purpose of electrically, pneumatically or hydraulically controllable valves. This aspect does not however form part of the invention.

Figure 6C:
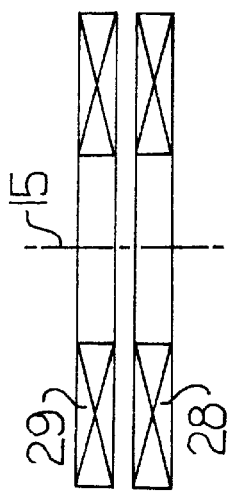
FIG. 6C shows a schematic view corresponding with FIG. 6A of an inductive transmission.
Figure 6B:
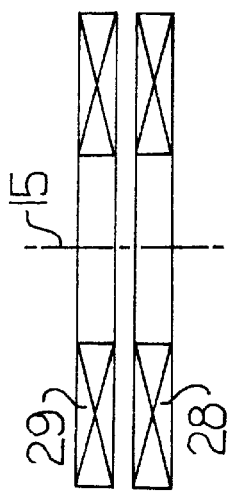
FIG. 6B shows a view corresponding with FIG. 6A of capacitive optical transmission.
Figure 6:
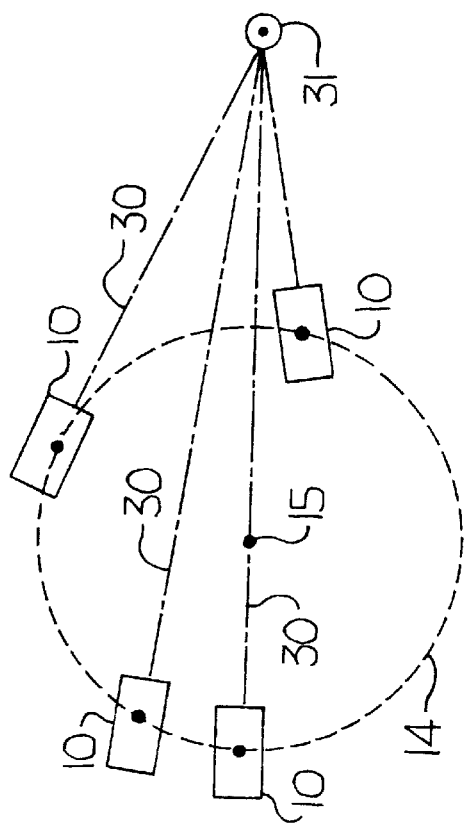
FIG. 6 is a schematic representation of an embodiment with fixed orientation relative to the centre of the path.

FIG. 6 shows the annular path 14 in which weighing device 10 can move as according to arrows 16. Owing to the fixed arrangement of weighing device 10 on support platform 9, it has a fixed orientation relative to the centre 15 of the path 14. Designated symbolically are two cables 17, which connect weighing device 10 to respective split rings 18 and 19 via respective slide contacts 20 and 21.

Figure 6A:
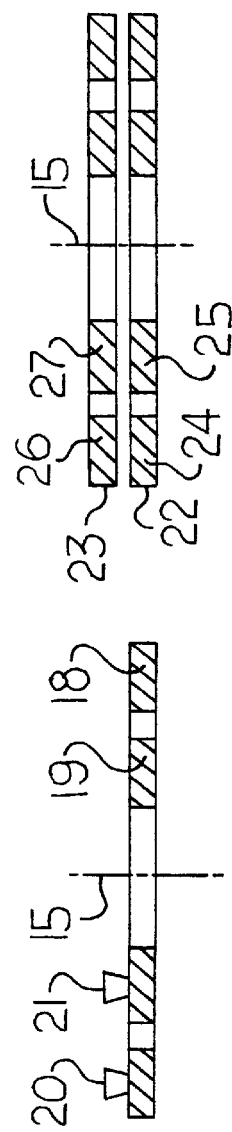
FIG. 6A shows a cross-section through the central transmission device with slide contacts.

FIG. 6A shows the relevant configuration.

FIG. 6B shows an alternative. In this embodiment there are two possibilities. A lower structure 22 and an upper structure 23 mutually co-act for the electrical transfer of energy and signals. In a practical embodiment the lower structure, which is fixedly disposed, comprises an outer ring 24 and an inner ring 25, while the upper structure has rings co-acting therewith, i.e. an outer ring 26 and an inner ring 27. The upper structure is connected to support platform 9 and therefore rotatably movable. Rings 24, 25, 26, 27 can be pairs of capacitor plates co-acting for capacitive transfer, particularly while making use of high recencies. Use can also be made of light-emitting junctions or semiconductor diodes and light-sensitive receptors co-acting therewith. It is also possible to transfer energy as well as analog or digital information with such structures.

FIG. 6C shows a lower structure 28 and an upper structure 29 which comprise respective, mutually co-acting annular coils for inductive transfer of power supply, for instance with a frequency of 10 KH and the transfer in reverse direction of information, for instance information with a frequency content considerably above said power supply frequency.

Figure 7:
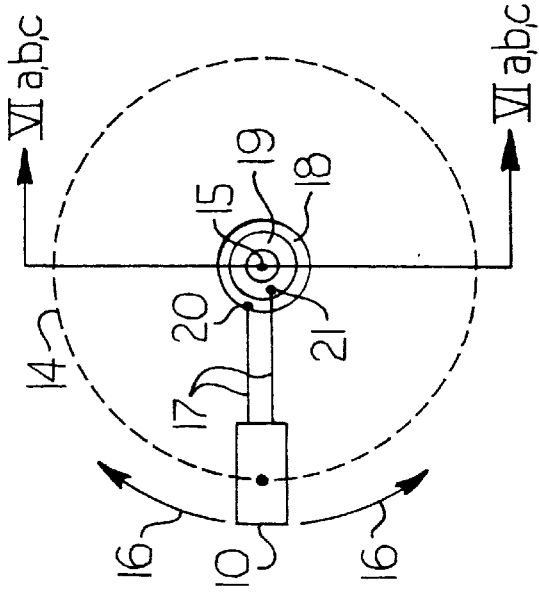
FIG. 7 shows an embodiment with fixed orientation relative to a fixed point outside the circular path.

FIG. 7 shows an embodiment wherein a symbolically designated arm 30 of variable length, for instance an arm consisting of telescopically co-acting parts, is connected non-rotatingly on one side to weighing device 10 and connected pivotally on the other side to a hinge 31. The structure shown in FIG. 7 ensures that the net rotation of weighing device 10 amounts to zero after covering a path of 360°.

Figure 8:
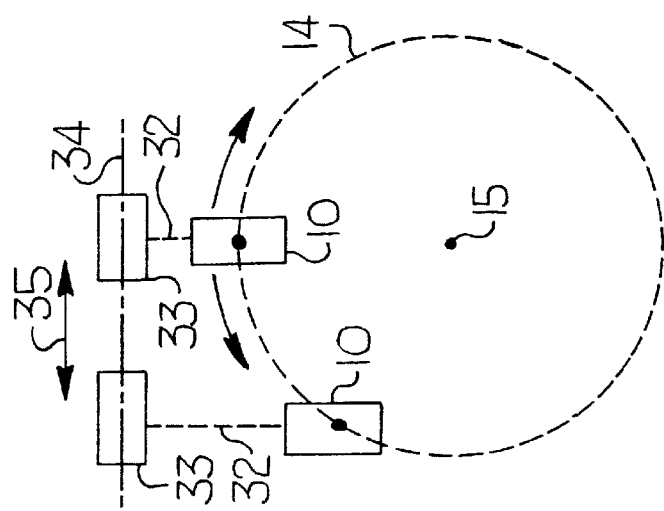
FIG. 8 is a schematic representation of an embodiment with invariable orientation making use of mechanical XY guide means.

FIG. 8 shows a variant wherein via an arm 32 of variable length the weighing device 10 is movable with fixed orientation relative to a carriage 33, which is movable reciprocally as according to arrow 35 along a straight guide 34. With this configuration, as shown in FIG. 8, the orientation of weighing device 10 is kept invariable and independent of the position on the path 14 of weighing device 10.

Figure 10:
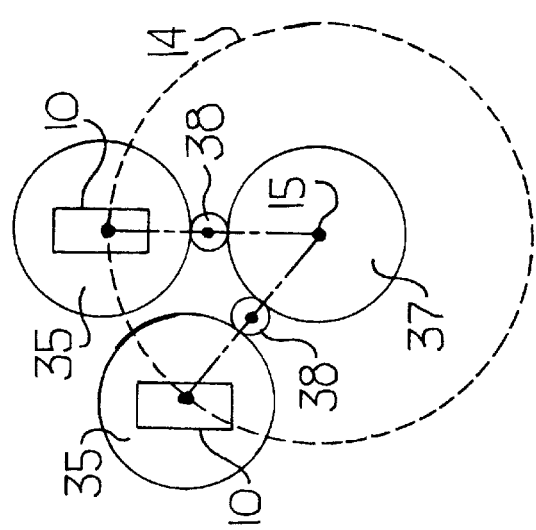
FIG. 10 is a variant with toothed wheels.
Figure 9:
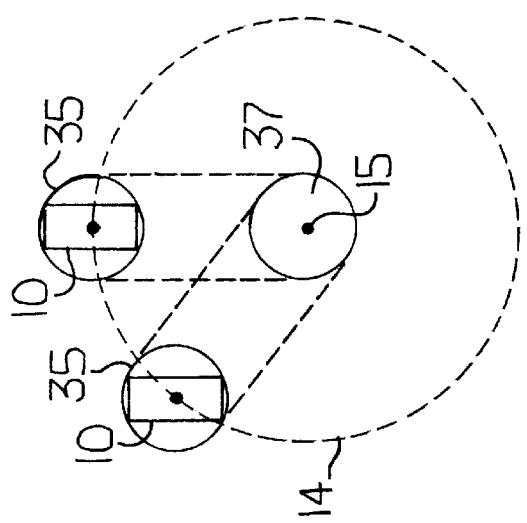
FIG. 9 is a variant with edge wheels and a chain or toothed belt.

FIGS. 9 and 10 show variants which realize the same effect with other means.

In the embodiment according to FIG. 9, weighing device 10 is supported by a toothed wheel 35 which is rotatable relative to path 14 and which co-acts via a toothed belt or chain 36 with a fixedly disposed central toothed wheel 37. Toothed wheels 35 and 37 are identical. The orientation of weighing device 10 is thus kept invariable over the whole path 14.

The configuration of FIG. 10 differs from the configuration of FIG. 9 insofar as toothed wheels 35 and 37 are not mutually coupled with a toothed belt or chain 36 but via a third toothed wheel 38 which is disposed such that the centres of toothed wheels 35, 38, 37 always lie on a collective radial straight line. FIG. 10 shows symbolically that the dimensions of toothed wheel 38 are irrelevant. Of essential importance however is that toothed wheels 37 and 35 are identical.

It is noted that transmission means other than those according to FIGS. 9 and 10 are also possible so as to ensure that the orientation of weighing device 10 is invariable.

What is claimed is:

1. An apparatus for dosed dispensing of a plurality of different liquid or pasty masses to a receiving container, the apparatus comprises:

first supporting means for supporting containers for the masses in fixed positions;

an annular frame bearing a plurality of dispensing nozzles controllable by control means, with each of the dispensing nozzles individually connectable to the containers via respective conduits;

second supporting means controllable by the control means for supporting the receiving container such that the receiving container is displaceable in an annular path corresponding with the annular form of the annular frame and placeable temporarily beneath a chosen dispensing nozzle for receiving mass dispensed by the chosen dispensing nozzle;

a weighing device supported by the second supporting means, wherein the weighing device is configured to support the receiving container, and wherein the weighing device is configured to supply signals to the control means that are representative of the weight of the receiving container and its contents, wherein the control means are adjustable for dispensing different masses in determined quantities to successive receiving containers in order to make successive mixtures of respective chosen compositions, wherein the control means are fixedly disposed on the annular frame, and wherein the weighing device is connected via the second supporting means to the fixedly disposed control means by cable means for electrically connecting the weighing device to the control means such that when the second supporting means progress through a path extending through 360° net rotation of the cable means is substantially zero.

2. The apparatus as claimed in claim 1, wherein the cable means comprises a fixed part and a movable part movable with the second supporting means, and wherein the fixed part and the movable part are mutually connected by contact means.

3. The apparatus as claimed in claim 2, wherein the fixed part includes slide rings and the movable part includes slide contacts co-acting with the slide rings.

4. The apparatus as claimed in claim 2, wherein the fixed part and the movable part are coupled capacitively to each other.

5. The apparatus as claimed in claim 2, wherein the fixed part and the movable part are coupled inductively to each other.

6. The apparatus as claimed in claim 2, wherein the fixed part and the movable part are coupled optically to each other.

7. The apparatus as claimed in claim 1, wherein the signals supplied to the control means by the weighing device are indicative of a change in weight of the receiving container and its contents.

8. The apparatus as claimed in claim 1, wherein the control means is one of a programmable logic controller and a programmable computer.

9. The apparatus as claimed in claim 1, wherein the cable means comprises at least one cable connected to the weighing device, at least one split ring connected to the control means, and a slide contact connecting the cable to the split ring.

* * * * *

UNITED STATES PATENT AND TRADEMARK OFFICE
CERTIFICATE OF CORRECTION

PATENT NO. : 6,250,344 B1
DATED : June 26, 2001
INVENTOR(S) : Jan Gerritse

It is certified that error appears in the above-identified patent and that said Letters Patent is hereby corrected as shown below:

Column 2,
Lines 28-29, after "control means" delete "are".

Column 4,
Line 5, delete "(not shown)" and insert -- 40 --.
Line 63, "recencies" should read -- frequencies --.

Signed and Sealed this

Eleventh Day of December, 2001

Attest:

NICHOLAS P. GODICI
Attesting Officer
*Acting Director of the United States Patent and Trademark Office*